(12) United States Patent
Leblond

(10) Patent No.: US 8,220,752 B2
(45) Date of Patent: Jul. 17, 2012

(54) CONE-SHAPED WING WITH SAIL RANGES WITH OPPOSITE EFFECTS AND CONSTANT PROPULSION

(76) Inventor: Vincent Leblond, Bordeaux (FR)

( * ) Notice: Subject to any disclaimer, the term of this patent is extended or adjusted under 35 U.S.C. 154(b) by 997 days.

(21) Appl. No.: 12/159,092

(22) PCT Filed: Dec. 12, 2006

(86) PCT No.: PCT/FR2006/002702
§ 371 (c)(1),
(2), (4) Date: Jun. 25, 2008

(87) PCT Pub. No.: WO2007/080257
PCT Pub. Date: Jul. 19, 2007

(65) Prior Publication Data
US 2009/0134278 A1    May 28, 2009

(30) Foreign Application Priority Data
Dec. 26, 2005  (FR) ...................................... 05 13308

(51) Int. Cl.
*A63H 27/08* (2006.01)
*B64C 31/06* (2006.01)

(52) U.S. Cl. .................................................. 244/153 R

(58) Field of Classification Search .............. 244/153 R, 244/154, 900–902; D12/321; D21/445, D21/446, 449
See application file for complete search history.

(56) References Cited

U.S. PATENT DOCUMENTS

| | | | | | |
|---|---|---|---|---|---|
| 1,734,493 | A | * | 11/1929 | Knott | 244/153 R |
| D152,610 | S | * | 2/1949 | Green | D21/449 |
| 2,483,614 | A | * | 10/1949 | Benson | 244/153 R |
| 2,941,765 | A | * | 6/1960 | Feldman | 244/153 R |
| D189,458 | S | * | 12/1960 | Jordan | D21/445 |
| 3,250,500 | A | * | 5/1966 | Hall | 244/153 R |
| 3,547,384 | A | * | 12/1970 | Clark | 244/154 |
| 3,740,008 | A | * | 6/1973 | Grauel | 244/153 R |
| D273,211 | S | * | 3/1984 | Ferrari | D21/445 |
| 4,708,078 | A | * | 11/1987 | Legaignoux et al. | 114/102.23 |
| 4,813,637 | A | * | 3/1989 | Bondestam | 244/153 R |
| 5,234,182 | A | * | 8/1993 | Renecle | 244/153 R |
| 5,669,803 | A | * | 9/1997 | Sweed | 446/61 |
| 6,062,510 | A | * | 5/2000 | De La Melena | 244/153 R |
| 6,260,803 | B1 | | 7/2001 | Hunts | |
| 6,955,325 | B1 | * | 10/2005 | Tabor et al. | 244/153 R |
| 2004/0188567 | A1 | | 9/2004 | Logosz | |
| 2005/0127240 | A1 | | 6/2005 | Culp | |

* cited by examiner

*Primary Examiner* — Joshua J Michener
(74) *Attorney, Agent, or Firm* — Young & Thompson

(57) ABSTRACT

A cone-shaped wing allows constant propulsion for pulling and lifting various loads. Sails in the shape of a flattened cone with an axis offset downward, whose base is connected to the leading edge in the shape of an oval with a rectilinear and horizontal base and the opposite side that is cut out in the form of a water droplet delimits the trailing edge, offer ranges whose aerodynamic force resultants are opposite one another. Two upper and two lower control lines are distributed around the leading edge and are connected at the other end to a control system designed to keep the two left lines separated from the two right lines and varying the length of the upper lines relative to that of the lower lines. The wing continuously delivers its power in the direction of the wind or on the side while being immobile when the user is stopped.

17 Claims, 5 Drawing Sheets

CONE-SHAPED WING WITH SAIL RANGES WITH OPPOSITE EFFECTS AND CONSTANT PROPULSION

This invention relates to a propulsive wing for pulling or lifting a load that comprises flexible sails that are connected, at the front, to an oval-shaped leading edge, flattened at its base, and, at the rear, to an elliptical trailing edge, whereby the sails have a conical shape with an axis that is offset downward and opposing propulsive ranges; the wing also comprises three or four control lines distributed over the leading edge.

Propulsive wings for pulling or lifting a load are currently used for certain sports where the user is towed by the wing while his feet rest on a board on the water (kiteboarding), on snow (snowkite) or on wheels (mountainboard). These wings are of several types:
With a leading edge that can be inflated in the shape of an arch and control lines at the ends,
With flattened sails and numerous paragliding-type shroud lines.

They have the common characteristic of exerting their pulling at a high speed that is perpendicular to the direction of the wind, so that upon stopping, the propulsive force is intermittent, and upon moving, the user has the task of maneuvering the wing frequently, which requires controlling its balance, its supports and its edge setting while frequently modifying the orientation of the wing. The practice of these sports is therefore elitist and requires a long apprenticeship.

The wing according to the invention produces continuous traction while being immobile in flight when the user is stopped, allows movements of the latter without moving the wing to maintain consistent traction, and leads to simplified handling of the board or the towed device.

In contrast, this new wing has the advantages of an important adjustment of the angle of incidence of the upper propulsive range for a significant loss of power and therefore increased safety for the user, a take-off and a landing that can be easily carried out without using a third party, as well as optionally shorter flight lines because the wing does not require movements from top to bottom.

Finally, this wing is an advantageous alternative to the sail-mast system of the pleasure sailboats: the larger sails for a boat of the same size, the lightened structure of the design and the upward traction produce a lower resistance of the hull on the water and therefore a greater speed. Likewise, the wing represents a source of energy savings for merchant motor ships.

The invention is characterized in that it comprises flattened-cone-shaped sails with an axis offset downward and therefore several sail ranges whose aerodynamic force resultants are opposite one another.

The base of these sails is connected to the leading edge that preferably, but not necessarily, consists of an inflatable oval-shaped flange with a rectilinear and horizontal base that is parallel to the largest axis that can rest on the ground or on water in a stable manner.

The other side of the sails constitutes the trailing edge; the sails at this location are perforated in a shape like a water droplet with the tip oriented toward the leading edge.

This shape thus delimits a propulsive range of the largest upper sails, two propulsive ranges of lateral sails of intermediate sizes, and a lower propulsive range of smaller size.

Four control lines are distributed into two so-called upper control lines and two so-called lower control lines. They have one of their ends attached around the leading edge and the other connected to a control system that is designed to keep the two left lines separated from the two right lines and to vary the length of the upper lines relative to that of the lower lines.

From the equilibrium position of the wing at rest on the ground or on the water, the user lightly holds the lines before shortening the length of the upper control lines relative to the length of the lower lines until the wing takes off and rises to a stable and immobile flight position if the user is stopped. The wing then exerts continuous traction in the direction of the wind.

An additional shortening of the upper control lines makes the wing lose power, and said wing remains at altitude or comes in for a soft landing if the action is continued.

A reduction of the length of the lower lines increases the power of the wing that remains at altitude or quickly drops if the action is continued.

Tension of the left lines orients the wing toward the left relative to the direction of the wind up to a stabilized position. The wing then exerts continuous traction toward the left relative to the direction of the wind. Tension of the right lines produces the same effects on the wing toward the right.

According to particular embodiments, the propulsive wing comprises one or more of the following characteristics:
The end of each control line is connected to the leading edge by means of several shroud lines,
Inflatable transverse slats allow the leading edge of the wing at rest to always be inclined relative to the ground or the water so as to facilitate take-off,
An inflatable arch that is semi-circular in shape and is connected to the front face of the leading edge along its small or its large axis allows the wing not to fall with its leading edge against the ground or the water and in all cases to be positioned on the side of its sails for an easy take-off,
Tightening straps that connect the opposite sides of the leading edge limit the deformation of the latter,
Other tightening straps that are distributed along the horizontal base of the leading edge and that are separated from the latter by a rigid bar stiffen the leading edge and keep it in its rectilinear shape,
The control bar comprises two guides that freely rotate and through which the left and right control lines pass,
The passing of the control lines through the guides consists of a material that is fairly flexible to allow the movement of the lines when the bar is rotated and fairly resistant to lock the lines the remainder of the time.

The propulsive wing will be explained in detail taking into account the accompanying drawings that are provided by way of examples that show the wing in a flight setting, seen from the same height and in which.

Figure 4:
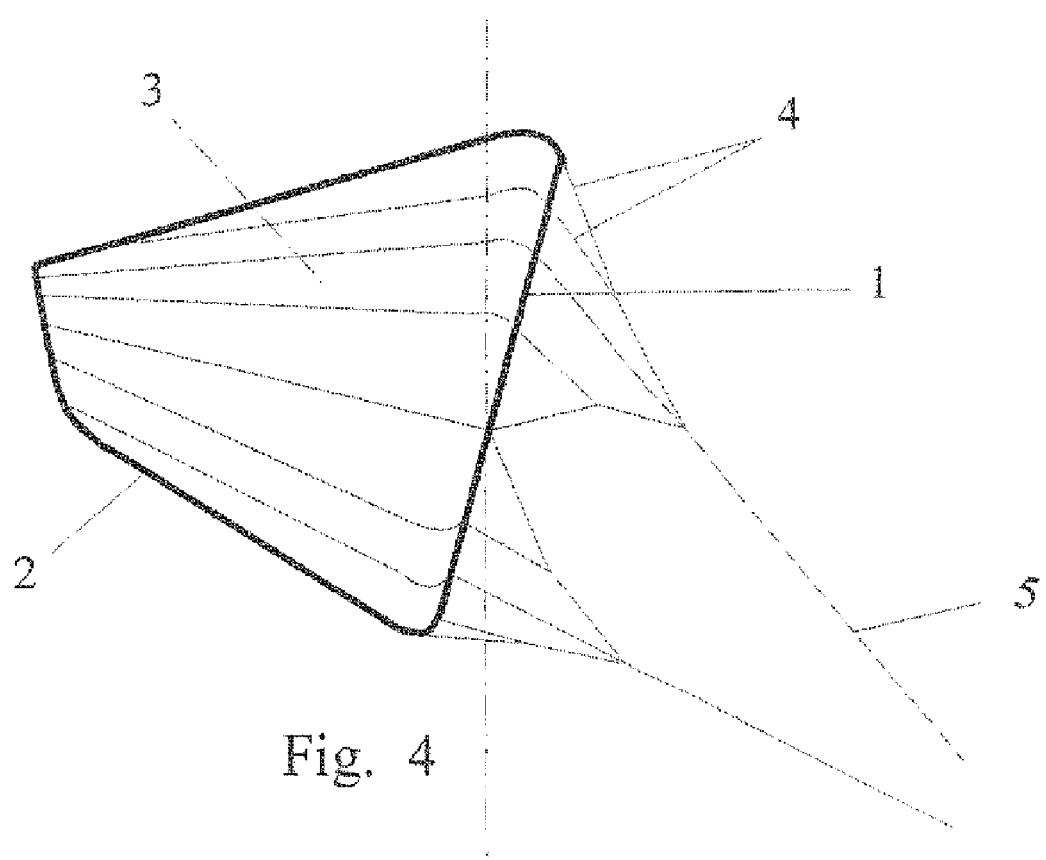
Figure 5:
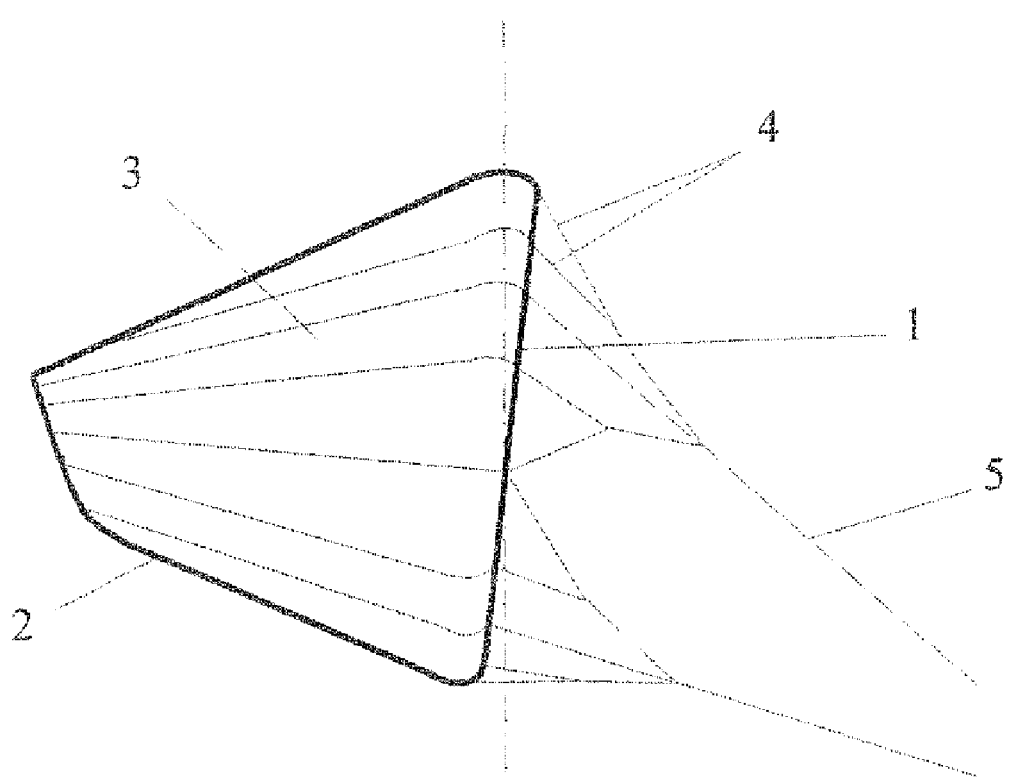
Figure 6:
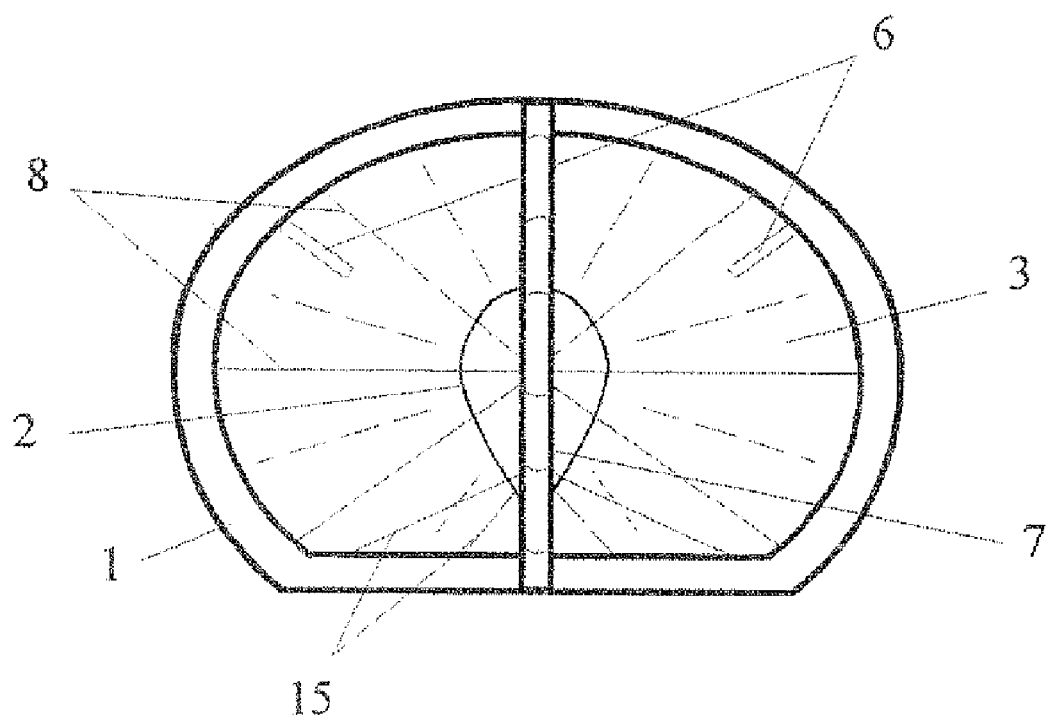
Figure 7:
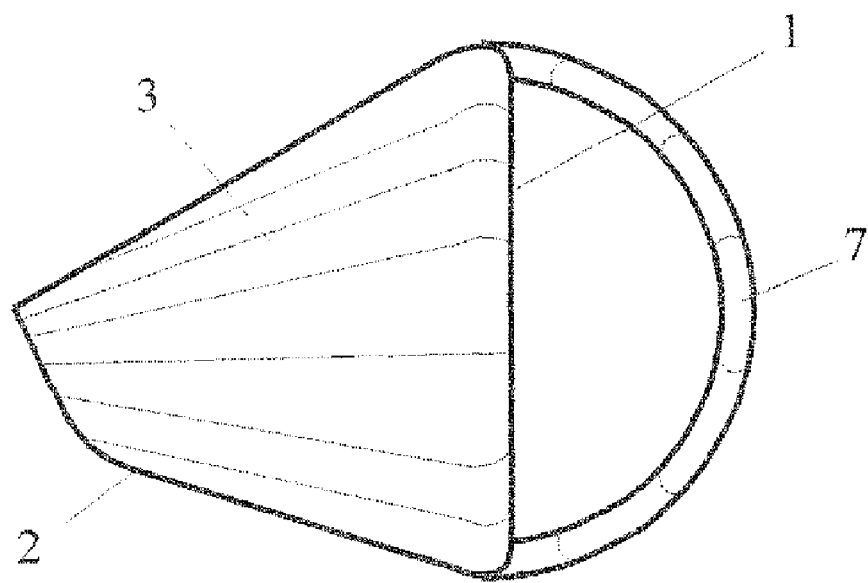
Figure 8:
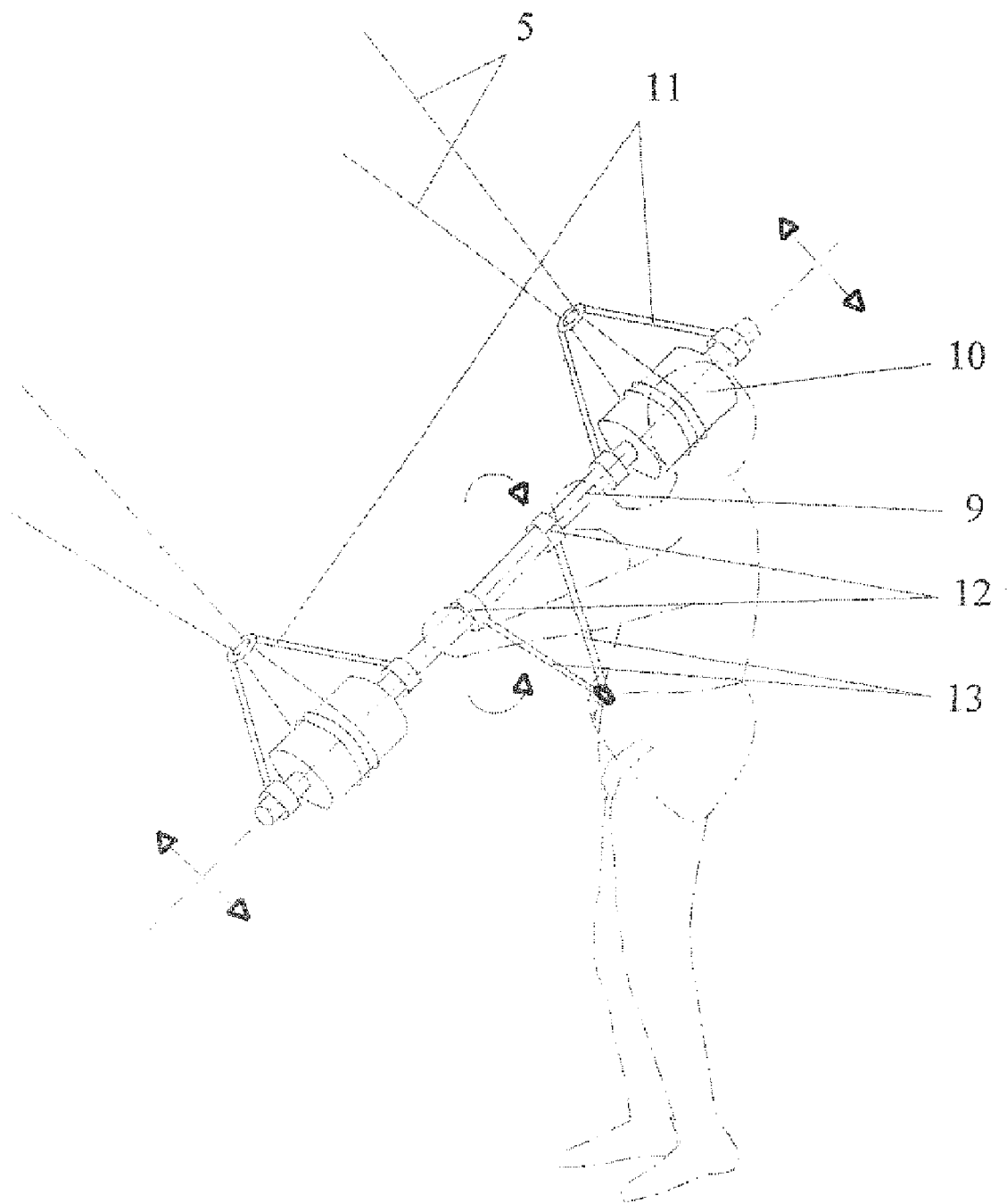

FIG. 4 shows a left-side view of the wing, whereby the upper lines are shortened (and the lower lines are elongated), and the incidence of the upper range of the sails is shortened to allow a release of the pressure of the wing, FIG. 5 shows a left-side view of the wing in a stronger traction position, FIG. 6 shows a front view of the wing, without the shroud lines and the primary control lines, showing the inflatable transverse slats, the inflatable arch that is semi-circular in shape, and the tightening straps for maintaining the profile of the leading edge, FIG. 7 shows a left-side view of the wing that shows the inflatable arch, FIG. 8 shows a perspective view of the control bar of the wing.

The wing is always shown inflated by the wind. Its size may vary enormously depending on use, from several meters to several tens of square meters.

Figure 1:
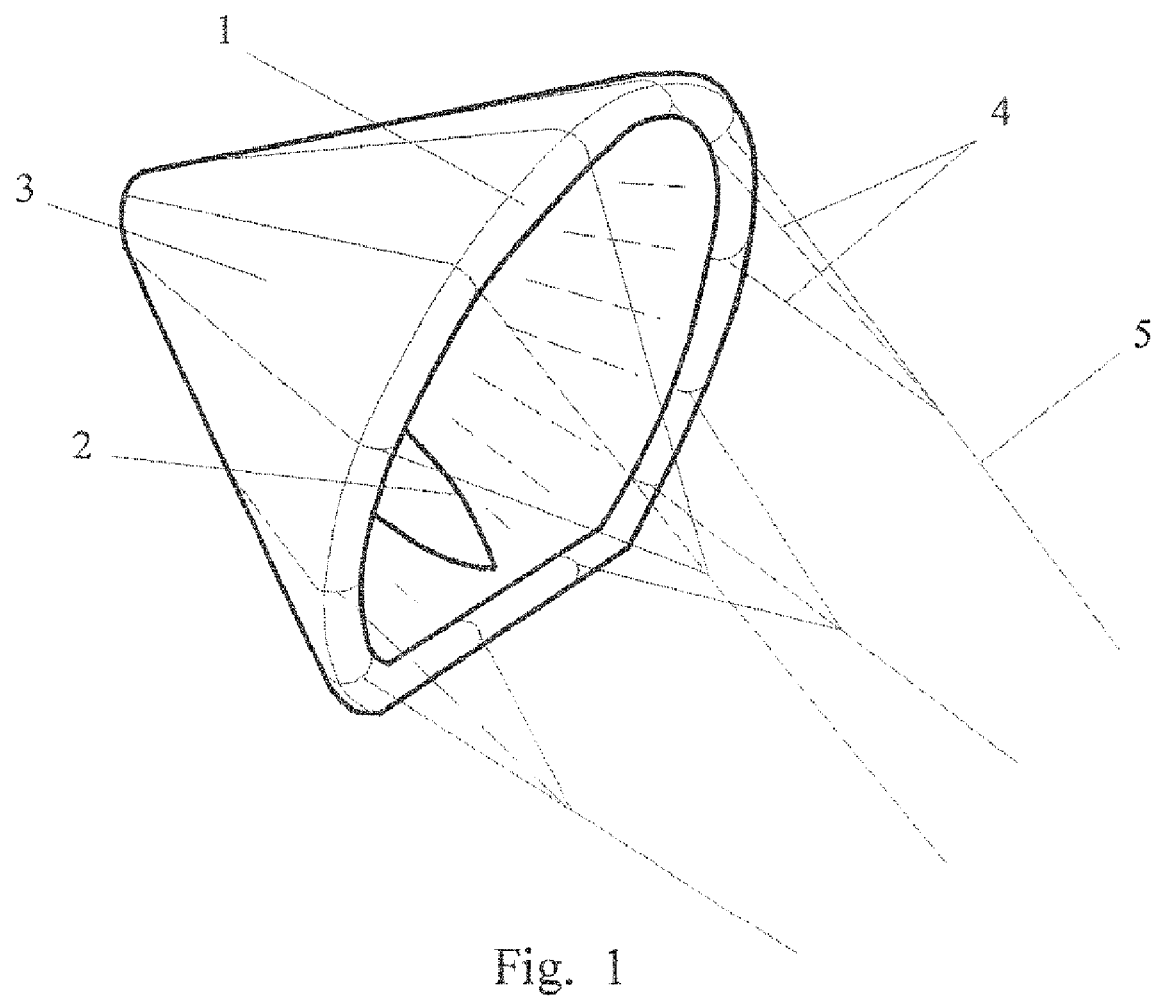
FIG. 1 shows a perspective view of the wing.

FIG. 1 provides an overall view of the wing. The latter assumes the shape of a cone that can be flattened and that may have an axis that is offset downward and that comprises several sail ranges (3) whose aerodynamic force resultants are opposite one another. Thus, the propulsive range of the upper sails—the largest—has an aerodynamic force resultant that is oriented upward and whose effect is contradicted by two propulsive ranges of lateral sails with their aerodynamic force resultant oriented backward and a lower propulsive range—the smallest—with an aerodynamic force resultant that is oriented downward.

To ensure the stability of the wing in flight, the greatest length of the sails (3) is positioned at the highest part and reaches approximately the value of the small axis of the leading edge (1).

These flexible and light sails (3) consist of a low-deformable synthetic material that is fairly impervious to water and appropriately resistant to wear and tear. It is connected at its base to the leading edge (1) of the constant circular section that consists of, for example, an inflatable sheath with an air chamber. The material should be flexible, light and resistant so as not to become deformed under the inside air pressure and facing multiple folds. This leading edge may assume an oval shape with a rectilinear and horizontal base that is parallel to the largest axis that can rest on the ground or on the water in a stable manner.

The other end of the sails (3) constitutes the trailing edge (2) in the form of a recess that represents a water droplet with the tip oriented toward the leading edge (1).

For their manufacturing, the sails can be drawn and cut out flat in the shape of a half-disk whose radius corresponds to the greatest length of the sails, i.e., approximately the value of the small vertical axis of the leading edge (1).

Figure 2:
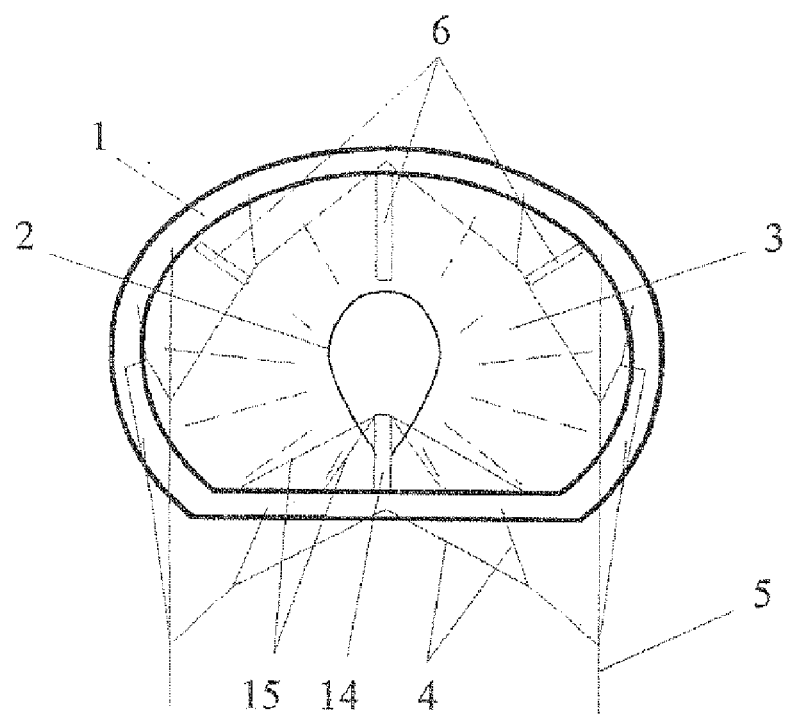
FIG. 2 shows a front view of the wing.
Figure 3:
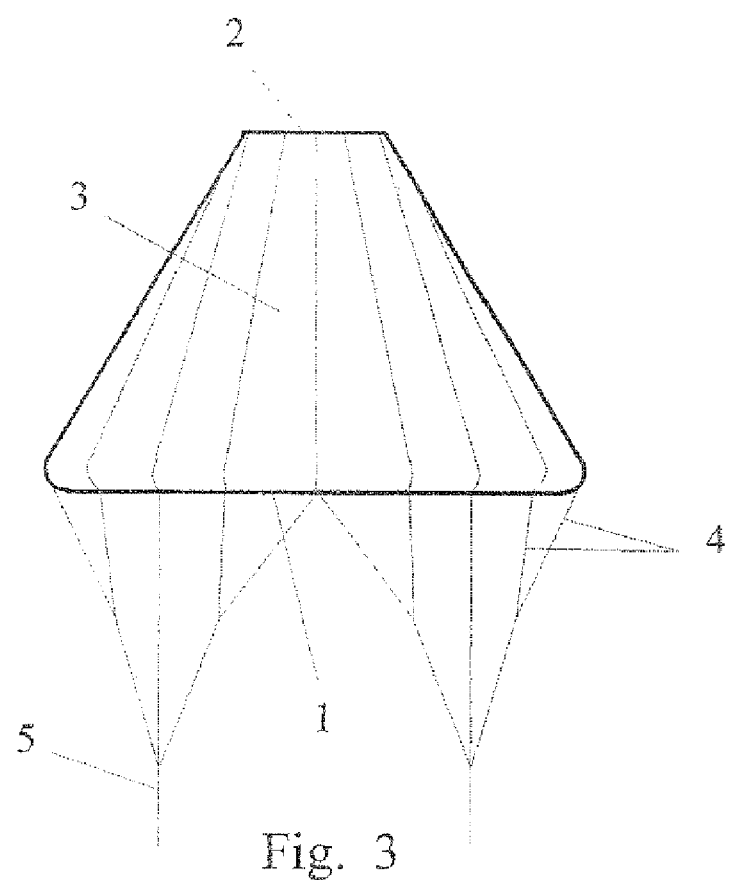
FIG. 3 shows a top view of the wing.

Owing to its design, the sails in flight are systematically stretched by the wind. It is advisable, however, to place several inflatable transverse slats (6), as indicated in FIG. 2, along the sails (3) so as to prevent the leading edge (1) from resting flat on the ground or on the water. The bases of these slats (6) are all in contact with the ground when the wing is at rest, and a portion of the upper range of the sails is therefore picked up by the wind and thus facilitates take-off.

The other side of the leading edge—facing the wind—is, in contrast, equipped with an inflatable arch (7) that is placed along the small axis of the leading edge (1) (as indicated in FIGS. 6 and 7) or along the large axis so as to prevent its flattening from this side and to force its positioning on the side of the sails (3).

These transverse slats (6) and the arch (7) can be connected to the leading edge (1) so as to require only one inflation orifice.

In contrast, tightening straps (8), as shown in FIG. 6, ensure that the leading edge (1), whose opposite tips are connected while being attached to their center, keeps its shape. They are at least two in number.

Other tightening straps (15), as shown in FIG. 2, connect the rectilinear base of the leading edge (1) to the same tip that is located on the small axis of the leading edge and that is kept separated by a rigid bar. This stiffening device maintains the rectilinear shape of the base of the leading edge (1).

The piloting of the wing can be ensured by:

A single upper control line that is connected to the highest tip of the leading edge (1) on its vertical axis and two lower control lines that are connected at the tips of the leading edge (1) that are symmetrical relative to the small axis and placed below the large axis, A single lower control line that is connected at the center of the base of the leading edge (1) on its small vertical axis and two upper control lines that are connected at tips of the leading edge (1) relative to the small axis and placed above the large axis, Two upper control lines that are connected at tips of the leading edge (1) that are symmetrical relative to its small vertical axis, placed above the large axis, and two lower control lines that are connected at tips of the leading edge (1) that are symmetrical relative to the small axis and placed below the large axis (case of FIGS. 1 to 5).

The attachment points of these lines (5) should be sufficiently separated from the axes to ensure the stability of the wing in flight while allowing the pivoting of the wing under good conditions of precision and amplitude around its axes.

In contrast, in the case of a leading edge that consists of an inflatable flange or a semi-rigid structure, each line is held by several shroud lines (4) that are mounted to slide so as to limit the deformation of the profile of the leading edge (1) and to keep the shroud lines (4) stretched during the variation of the incidence of the wing.

The other end of the lines is connected to a control system that is designed to keep the two left lines separated from the two right lines and to vary the length of the upper lines relative to that of the lower lines.

In the case of the smallest wings, this can be two handles that bring the two left lines together to be held in the one hand and the two right lines to be held in the other.

In the case of the larger wings, it is advantageous to use a bar as indicated in FIG. 8 where the two left lines are wound in the opposite direction in several turns on a roller (10) with a larger diameter than the bar (9), integral with the latter and with the same axis and placed at the left end, and the two right lines placed in the same way at the right end of the bar (9). Two guides (11) freely rotate around the bar (9) and the right and left control lines pass through them. They ensure the precise winding of the lines on the rollers (10) when the bar is oriented. The rotation of the bar in one direction elongates the upper lines and shortens the lower lines.

The passage of the control lines (5) through guides (11) consists of a material that is fairly flexible to allow the movement of lines when the bar is rotated and fairly resistant to lock the lines the remainder of the time. This device maintains the good winding of the lines (5) around the rollers (10) when the lines are slack.

Finally, two braces (12) that freely rotate around the bar (9) and that are held in translation make it possible to connect the unit to the user's harness by means of a rope (13). Thus, tension from the left side of the bar (9) brings together the left control lines of the user and therefore orients the wing to the left. The tension from the right side creates the reverse effect.

The length of the control lines (5) can vary greatly from several meters for a facilitated implementation and use to several tens of meters to take advantage of a stronger and more uniform wind than at the surface of the ground or the water.

Before take-off, the wing rests on the horizontal base of the leading edge (1) and on its transverse slats (6), facing the wind. The leading edge is therefore inclined and a portion of the upper range of the sails (3) is picked up by the wind. The user then moves by rotating the bar (9) until the upper and lower control lines (5) are slightly stretched. The bar is consequently rotated to shorten the upper lines (and to lengthen the lower lines—direction of the arrow from the top of FIG. 8) until the wing rises vertically and reaches its flight position that is close to that of FIG. 4.

A release of the upper lines increases the incidence of the upper range of the sails (3). The wing then loses a little altitude and reaches a flight position that is close to that of FIG. 5. The wing is immobile if the user is stopped, and its power is at a maximum in the direction of the wind.

From this strong traction position, a shortening of the upper lines decreases the incidence of the upper sail range and decreases the power of the wing, which takes on a little altitude. Additional shortening then makes the wing slowly drop, and said wing then loses all power. This procedure guarantees high safety for the user in the event of a wind gust and also makes it possible to bring together the wind of the ground or the water before fully releasing the upper lines to swing the wing around the large axis of the leading edge (1) and to put it beside its sails (3) that are supported by the transverse slats (6).

An emergency procedure, if necessary, consists in fully releasing the upper lines from a flight position to drop the wing that quickly falls to rest in its stable position on the ground or on the water, balanced on the horizontal base of its leading edge (1) and its transverse slats (6).

In flight position, the large axis of the leading edge (1) is horizontal when the wing is in the axis of the wind (representation of FIG. 2). The control bar (FIG. 8) is horizontal. Pulling on the left side of the bar orients the wing that moves away from the axis of the wind toward the left. The wing loses a little altitude, and its left side is slightly lowered. The wing is immobile if the user is stopped and exerts his power from the left side relative to the direction of the wind. Pulling on the right side produces the opposite effects.

Several examples of angles are provided purely by way of indication to identify approximately the position of the wing in flight; they actually depend on the particular conditions of the implementation of each wing and the flight circumstances:

Mean angle of the control lines in flight relative to the ground: 30 to 50 degrees, Mean angular range of movement of the wing relative to the axis of the wind: more or less 40 to 60 degrees, Possible inclination of the leading edge of the wing (1) in flight relative to the vertical, upper tip of the leading edge toward the front (position of FIGS. 4 and 5): up to about 30 to 40 degrees.

This wing with constant propulsion has many possible applications. The most obvious relate to the sports that involve a user who rests on a board and is towed by this wing (kiteboarding, snowkite, mountainboard) and sailing, whereby this wing partially or completely takes the place of the sails or the engine.

The invention claimed is:

1. A propulsive wing, comprising:
a cone shaped sail (3) with a leading edge (1) at a first side and a trailing edge (2) at an opposite side, second side; and
control lines (5) received by the leading edge (1), the control lines (5) for connection to a load that is to be towed or lifted behind the leading edge (1) of the sail (3),
the trailing edge (2) having an elliptical water droplet shape with a tip oriented toward the leading edge (1), the droplet shape delimitting an upper propulsive range of the sail and a lower propulsive range of the sail, the lower propulsive range being of a size smaller than a size of the upper propulsive range.

2. The propulsive wing according to claim 1, wherein the tip of the elliptical water droplet shape is close to the leading edge (1).

3. The propulsive wing according to claim 1, wherein the sail (3) has a flattened cone shape and the leading edge (1) has an oval shape with a large horizontal axis and a small vertical axis.

4. The propulsive wing according to claim 3, wherein the leading edge (1) comprises an upper oval shaped portion and a lower rectilinearly portion parallel to the large horizontal axis that can rest on a surface in a stable manner.

5. The propulsive wing according to claim 1, wherein the sail (3) has a highest part with a greater length that is equal to the height of the leading edge (1).

6. The propulsive wing according to claim 1, wherein the leading edge (1) comprises of an inflatable sheath.

7. The propulsive wing according to claim 1, wherein the sail (3) comprises inflatable transverse slats (6) that prevent the leading edge (1) from resting flat on a surface.

8. The propulsive wing according to claim 1, wherein the sail (3) comprises an arch (7) attached to opposite sides of the leading edge (1).

9. The propulsive wing according to claim 1, wherein the sail (3) comprises tightening straps (8) connected to opposite sides of the leading edge (1), said tightening straps (8) being attached together at their center so that the tightening straps (8) keep a shape of the leading edge (1).

10. The propulsive wing according to claim 1, wherein said control lines comprise:
a single upper control line connected at the highest tip of the leading edge (1); and
two lower control lines connected at symmetrical tips of the leading edge (1) relative to a vertical axis of the leading edge (1) and placed below a horizontal axis of the leading edge (1).

11. The propulsive wing according to claim 4, wherein said control lines comprise:
a single lower control line connected to the center of the lower rectilinear portion of the leading edge (1); and
two upper control lines connected at symmetrical tips of the leading edge (1) relative to a vertical axis of the leading edge (1) and placed above a horizontal axis of the leading edge (1).

12. The propulsive wing according to claim 1, wherein said control lines comprise:
two upper control lines connected at symetrical tips of the leading edge (1) relative to a vertical axis of the leading edge (1) and placed above a horizontal axis of the leading edge (1); and
two lower control lines connected at symmetrical tips of the leading edge (1) relative the vertical axis of the leading edge (1) and placed below the horizontal axis of the leading edge (1).

13. The propulsive wing according to claim 1, further comprising:
a control bar (9); and
two guides (11) that rotate freely around the control bar (9) and through which guides pass the control lines.

14. A propulsive wing, comprising:
a load (5);
a conical sail (3) with a leading edge (1) at a first side and a trailing edge (2) at an opposite side, second side,
the leading edge of a non-circular shape as viewed from the load looking toward the trailing edge (3),
the trailing edge (2) having an elliptical water droplet shape with a tip oriented toward the leading edge (1),
the droplet shape delimitting an upper propulsive range of the sail and a lower propulsive range of the sail, the lower propulsive range being of a size smaller than a size of the upper propulsive range; and
control lines (5) connected to the leading edge (1) and connected to the load (5), in use the load to be lifted behind the leading edge (1) of the sail (3).

15. The propulsive wing according to claim 14, wherein the non-circular shape of the leading edge (1) is comprised of a first circular portion connected to a second flat portion.

16. The propulsive wing according to claim 14, wherein the non-circular shape of the leading edge (1) is an oval shape.

17. The propulsive wing according to claim 16, the oval shape of the leading edge is comprised of a rectilinear and horizontal base parallel to a largest axis of the leading edge, the base arranged to rest on the ground in a stable manner.

* * * * *